Aug. 4, 1970  I. C. HUTCHEON  3,523,193

ELECTRIC CONTROLLER DEVICES

Filed June 24, 1968  4 Sheets-Sheet 1

INVENTOR
IAN CARRODUS HUTCHEON
BY Young & Thompson
ATTYS.

INVENTOR
IAN CARRODUS HUTCHEON
BY Young + Thompson
ATTYS.

Aug. 4, 1970   I. C. HUTCHEON   3,523,193
ELECTRIC CONTROLLER DEVICES
Filed June 24, 1968   4 Sheets-Sheet 4

INVENTOR
IAN CARRODUS HUTCHEON
By Young & Thompson
ATTYS

United States Patent Office 3,523,193
Patented Aug. 4, 1970

3,523,193
ELECTRIC CONTROLLER DEVICES
Ian Carrodus Hutcheon, Luton, England, assignor to George Kent Limited, Luton, England, a British Company
Filed June 24, 1968, Ser. No. 739,292
Claims priority, application Great Britain, June 26, 1967, 29,443/67
Int. Cl. G05b 7/00
U.S. Cl. 307—116                          24 Claims

ABSTRACT OF THE DISCLOSURE

Circuits are disclosed for electric controller devices providing output signals representing regulator position, which can be switched between "automatic" and "manual" operation without the need for a balancing operation and without a discontinuity or substantially without a discontinuity in the output, the circuits having an amplifier and capacitor means connected as a Miller integrator. Proportional and integral action control term signals are generated from an error signal and a derivative control term signal can be generated either from the error signal or from a signal representing the measured value under control. The control term signals can be independently and collectively varied and each can be adjustably limited in magnitude. Arrangements for preventing integral saturation at the output limits are described.

---

The invention relates to electric controller devices and specifically to that class of such devices which produce output signals representing regulator position, as opposed to those providing output signals representing regulator speed.

Most controllers of the class with which the invention is concerned provide an output which can be selected from an "automatic" output and a "manual" output, the latter being obtained by adjustment of a potentiometer or the like, and the former from a circuit to which is applied a control error signal corresponding to the difference between desired and measured values of the condition being controlled. Transfer from automatic to manual control and vice versa is of course frequently required. Such transfer would normally result in a discontinuity or "bump" in the controller output signal unless a balancing operation is first carried out to bring the two outputs into at least approximate equality. Such a balancing step takes time and skill, and elimination of the need to perform it is desirable provided this can be done without undue complication.

It is accordingly an object of the invention to provide an improved electric controller device producing an output signal representing regulator position.

It is a further object to provide such a device which is "bumpless" and "balanceless" in that it can be interchanged between automatic and manual operation without an intermediate balancing step and without a discontinuity, or without any substantial discontinuity, in its output.

It is another object to achieve "bumpless" and "balanceless" transfer in such a controller in a simple and effective manner.

The invention accordingly provides an electric controller device for providing an output representing regulator position, the device having switch means selectively movable between a first position for "automatic" output from a control function generating circuit in response to a control error signal representing any difference between signals representing respectively measured and desired values of the controlled condition and a second position for "manual" operation in which the device provides a "manual" output from an electrically adjustable memory circuit, and means arranged to adjust the control function generating circuit in accordance with the "manual" output during the "manual" operation and to adjust the memory circuit in accordance with the "automatic" output during "automatic" operation whereby the switch means can be moved from the first to the second position thereof and from the second to the first position thereof without a balancing operation and without or substantially without a discontinuity between the outputs, the device comprising capacitor means of which at least a part is connected to an amplifier, the amplifier having one input terminal at circuit earth, in a negative feedback configuration so as to act as a function generating means during "automatic" operation and as a memory means during "manual" operation. It will be understood that the amplifier and capacitor means are arranged to function as a Miller integrator.

In a controller device embodying the invention, the capacitor means can comprise a single low-leakage capacitor across the amplifier, which may be a low-drift D.C amplifier of standard operational type, that is, an amplifier without a differential or floating input circuit. The capacitor means can instead comprise a function generating capacitor connected across the amplifier and a memory capacitor arranged to be connected in parallel with the amplifier and the function generating capacitor during "manual" operation and to be connected across the amplifier output during "automatic" operation.

In controllers of the class to which the invention relates, it is desirable to prevent integral saturation, sometimes described as "reset wind-up," when the output signal reaches an upper or a lower limit. An electric controller device embodying the invention can therefore include means imposing predetermined upper and lower limits on the output and preventing integral saturation when either limit is reached.

The contributions of the control terms to the controller output in this kind of controller are preferably each adjustable and capable of being limited in magnitude. For example, the rate of integration, that is, the rate of operation of the control valve due to a steady control error signal, might be desirably restricted after transfer to automatic operation where there is a large control error signal present, for example, where a batch process is being started. This is particularly important as the controller device of the invention allows transfer to automatic operation without the need to consider the condition of plant being controlled. An electric controller device embodying the invention can therefore also include means for selective individual limitation at predeterminde values of the contributions to the controller output due to proportional and derivative action, and of the rate of change of the output due to integral action.

By way of example only, some controller devices embodying the invention are described below with reference to the accompanying drawings, in which.

In the various circuit diagrams illustrated, components having corresponding functions are indicated by the same reference numerals.

Figure 1:
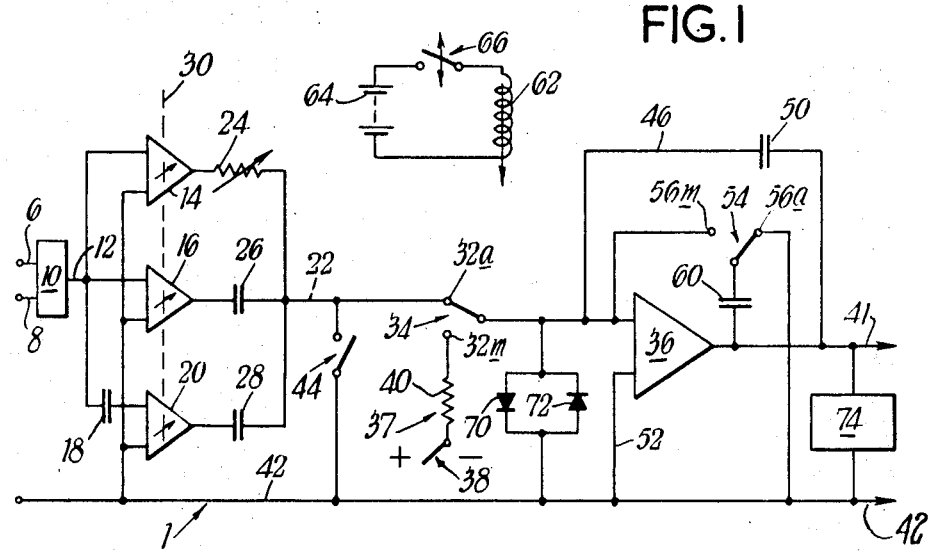
FIGS. 1, 2, 3 and 5 show the circuit diagrams, partly schematic, of four different controller devices each including separate integrating and memory capacitors.

FIG. 1 shows the circuit diagram 1 of an electric controller device having input lines 6 and 8 for signals obtained in any convenient way from apparatus under control and representing respectively the measured value and the desired value of a condition of the apparatus which it is desired to control. It will be understood that the apparatus of which a variable condition is to be controlled forms no part of the invention and that controller devices embodying the invention can be employed with many a wide variety of such apparatus. The input lines 6 and 8 connect to a subtraction network 10 which provides on a line 12 a control error signal $\theta$ representing the difference between the measured and desired values of the condition under control. The signal $\theta$ is here regarded as a voltage and is applied to a voltage amplifier 14, a second voltage amplifier 16 and through a capacitor 18 to a current amplifier 20. The outputs of the three amplifiers 14, 16, 20 are connected to a line 22 through a variable resistor 24, a capacitor 26 and a further capacitor 28 respectively. The line 22 thus receives three control term current signals epresenting $\theta$, $d\theta/dt$ and $d^2\theta/dt^2$.

The input amplifiers 14, 16, 20 are variable independently, so that the contributions of the three control terms can be controlled independently, and also collectively as indicated at 30 to provide proportional gain control. The input amplifiers 14, 16 are relatively simple and have a gain adjustable from 1 to 50 for example, The current amplifier 20 is of low input impedance and can again be of relatively simple design.

Adjustment of the integral action time (IAT) and of the derivative action time (DAT) can of course be effected in various other ways than as indicated, and derivative action can be obtained by differentiating the measured value signal instead of the control error signal $\theta$, where it is desired to minimize the change in output when the desired value setting is altered.

The line 22 extends through a switch 34 when the movable contact thereof is in engagement with an "automatic" terminal 32a to an amplifier 36. In another position of the switch, the movable contact engages a "manual" contact 32m to apply to the amplifier 36 a manually adjustable voltage or current signal, obtained from a raise-lower control device 37 comprising a two position switch 38 through a resistor 40, instead of the line 22. The control term generating circuits are then connected to the circuit earth line 42 by means of a switch 44 arranged to close in conjunction with change of the switch 34 from the "automatic" to the "manual" terminal 32m.

Across the main control amplifier 36 is connected a capacitor 50 by means of lines 46 and 48. The amplifier 36 is of high quality and has for example, a low voltage drift and a very low current drift, less than $10^{-10}$ a. when the capacitance of the capacitor 50 is 10 $\mu f$. The capacitor 50 is the main integral function generating capacitor, the voltage on which represents the integrated sum of the three control term current signals. The amplifier 36 has one input terminal connected by a line 52 to the line 42, so that this terminal is at circuit earth. It will be appreciated that the control function is generated on the principle of the Miller integrator, employing negative feedback. The Miller integrator integrates the control term current signals to provide an output signal comprising $\int \theta dt$, $\theta$, $d\theta/dt$.

The circuit also includes a memory capacitor 60 to the output side of the amplifier 36 on one side and to a switch 54 on the other. The movable contact of the switch 54 can engage either a "manual" terminal 56m to connect the capacitor 60 to the input side of the amplifier 36 or an "automatic" terminal 56a when the other side of the capacitor is connected to earth and the capacitor is continuously charged to the output of the device, obtained from the amplifier 36 and applied on output line 41.

The switches 34, 44 and 54 for effecting transfer of the device between manual and automatic control are arranged to be relay-operated together by a relay coil 62 powered from a current supply source 64 under control of a master switch 66, so that the transfer can be effected remotely.

It will be seen that movement of the switches 34, 44, 54 from the position giving automatic control to the position for manual operation effect disconnection of the inputs on the line 22 from the amplifier 36 to earth. The amplifier input is connected instead to the manually operable raise/lower control device 37. One side of the capacitor 60 is disconnected from earth and connected to the amplifier input, so that this capacitor is now connected around the amplifier. Because the capacitor 60 was previously connected across the amplifier output lines 41, the transfer to manual operation is bumpless and balanceless and the controller output signal remains at its previous value until the manual control device 37 is operated to adjust the output.

Instead of the simple raise/lower control device 37 shown, provision can be made for selection from two or more voltage or current signals, by means of further contacts for the switch 38. The control device can in any event advantageously be arranged to latch in the selected position to ensure that the controller output signal remains at the selected maximum or minimum value.

During manual operation, the capacitor 50 remains connected across the amplifier 36, the side connected to the amplifier input being effectively at earth potential, because of the connection through the line 52, so that the capacitor is charged continuuosly to the controller output voltage. Thus, on return of the transfer switches 34, 44, 54 to the "automatic" position, bumpless transfer from manual operation is achieved.

The circuit diagram of FIG. 1 includes means for preventing integral saturation, in the form of two diodes 70, 72 connected in opposed directions across the input of the amplifier 36. During automatic operation one or other of the two diodes keeps the amplifier input close to earth potential whenever the output reaches a limiting value and feedback current cannot flow. The capacitor 50 is thus prevented from charging beyond the limit voltage. The output will then immediately respond as soon as the current applied to the amplifier 36 falls through zero. The limiting values may be set by the amplifier or by a limiting device 74 connected across the output of the amplifier which is preferably but not necessarily adjustable.

Integral desaturation is thus achieved because it is not necessary to "unsaturate" or "unwind" the integral action before the output of the device can be reduced. During manual operation, the charge on the capacitor 50 is of course held equal to the output of the device, as mentioned above.

Figure 2:
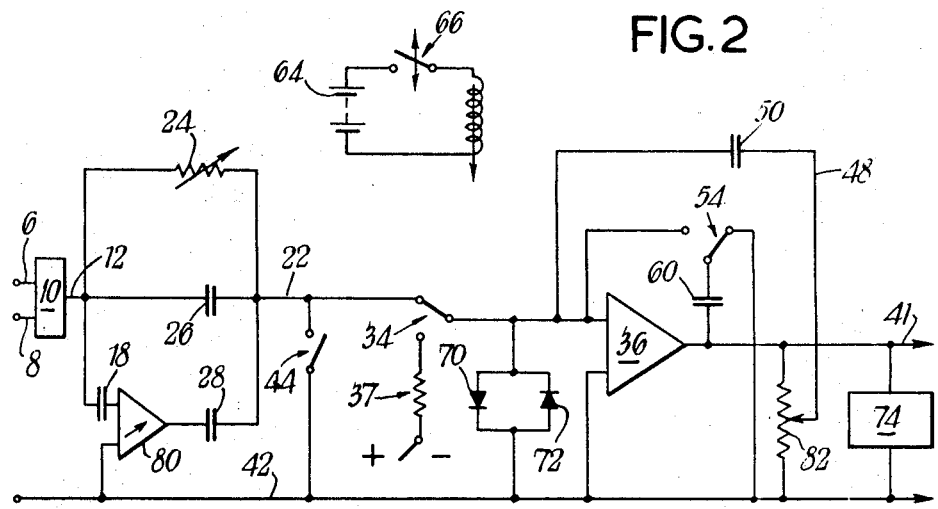

The circuit diagram illustrated in FIG. 2 is a modified version of that of FIG. 1.

The control error signal $\theta$ on the line 12 is applied directly to the variable resistor 24, to the capacitor 26, to a variable gain current amplifier 80 through the capacitor 18, the amplifier output circuit including the capacitor 28. The three control term current signals $\theta$, $d\theta/dt$ and $d^2\theta/dt^2$ are thus again generated and carried by the line 22 to the switch 34. The only other difference between the circuits of FIGS. 1 and 2 is that the line 48 from the capacitor 50 is taken not to the output of the amplifier 36 but to the movable contact of a potentiometer 82 connected across the output line 41 and earth.

The switching and main integrating and memory capacitor arrangements of FIG. 2 resemble those of FIG. 1 and bumpless, balanceless transfer between automatic and manual operation in either direction is effected and achieved in a like manner. The FIG. 2 circuit is simpler in not requiring the two voltage amplifiers 14 and 16 but there is a consequent restriction on limiting the magnitudes of the contributions of the control term signals. Proportional gain adjustment can however be effected by means of the potentiometer 82 in the feedback path of the amplifier 36.

Figure 3:
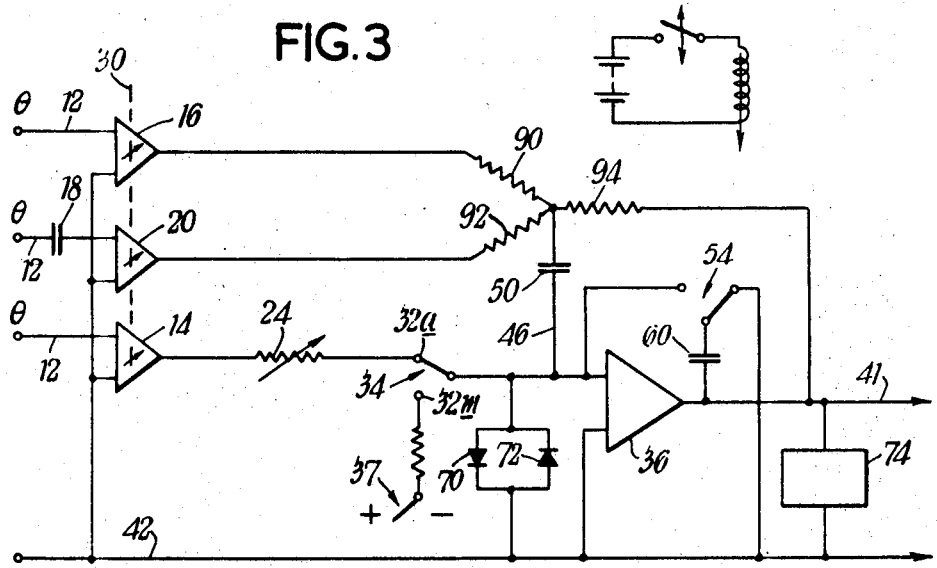

In FIG. 3 is shown the circuit diagram of a third controller device embodying the invention. The control error signal $\theta$, obtained as described in connection with FIGS. 1 and 2 or in any other suitable way, is applied on lines 12 to the three variable gain amplifiers 14, 16 and 20 and the variable resistor 24 is provided in the output of the amplifier 14, all as in the circuit of FIG. 1.

The outputs of the amplifiers 16 and 20 are however taken through resistors 90 and 92 respectively to a common connection 93 with a resistor 94 and the main integrating capacitor 50. The output of the amplifier 14 goes by way of the resistor 24 to the "automatic" terminal 32a of the switch 34. The switch 44 is omitted, the switch 34 being arranged to operate simultaneously with the switch 54 in the circuit of the capacitor 60 as before.

Figure 4:
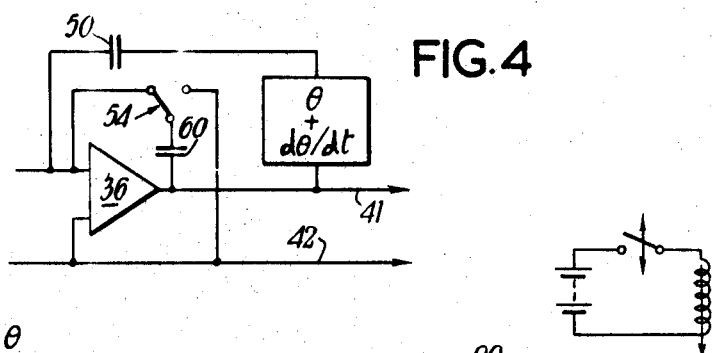
FIG. 4 is a simplified version of the circuit diagram of FIG. 3 given for purposes of explanation.

It will be appreciated that the circuit of FIG. 3 differs from that of FIG. 1 in that the control terms are generated in a different way. Thus $\theta$ and $d\theta/dt$ are developed and combined across the summing resistors 90, 92, 94 and injected into the feedback path of the amplifier 36, in effect into the line 48. This part of the circuit therefore corresponds to the simplified circuit diagram of FIG. 4. The proportional and derivative signals are thus added to the controller output signal on the line 41 by being fed in as a voltage in series with the capacitor 50. The integral signal developed in the resistor 24 is still applied to the input of the amplifier 36 during automatic operation and the voltage on the capacitor 50 thus represents the integral term only instead of the sum of all three terms as in the circuits of FIGS. 1 and 2.

Figure 5:
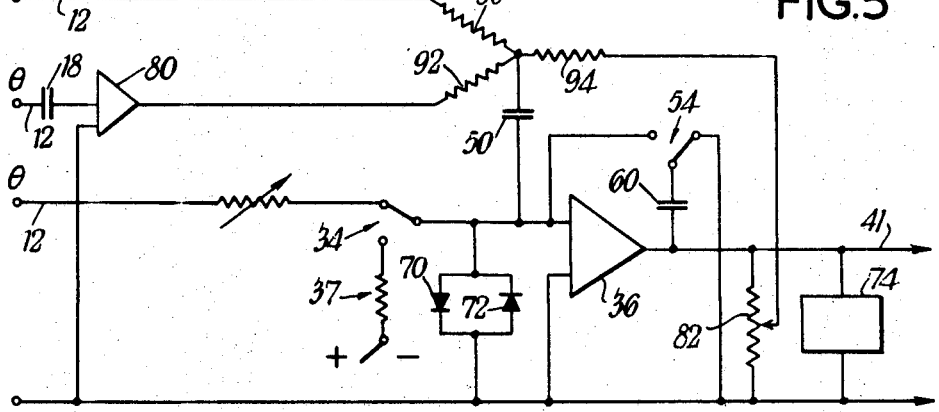

In the circuit of FIG. 5 the voltage control error signal $\theta$ is applied on the lines 12 directly to the resistor 90 and to the variable resistor 24, and to the resistor 92 through the capacitor 18 and the amplifier 80. The control term signals $\theta$ and $d\theta/dt$ are thus again developed and injected into the feedback line of the amplifier 36 by means of the resistors 90, 92 and 94 and the integral action time signal is applied to the amplifier input through the switch 34 when this is in the "automatic" position. The line 48 is connected not directly to the output line 41 but to the movable contact of the potentiometer 82 in the output circuit of the amplifier 36 for proportional gain adjustment.

FIGS. 3 and 5 thus show circuit diagrams of control devices which resemble those of FIGS. 1 and 2 in employing separate capacitors for memory and integral functions generation and also in their functioning on transfer between manual and automatic control. Integral desaturation is achieved in both the later circuits by the pair of diodes 70, 72. Proportional band adjustment is effected by means of the input amplifiers 14, 16, 20 in the device of FIG. 3, as in FIG. 1, but in the feed back path by the potentiometer 82 in the device of FIG. 5, as in FIG. 2.

Figure 6:
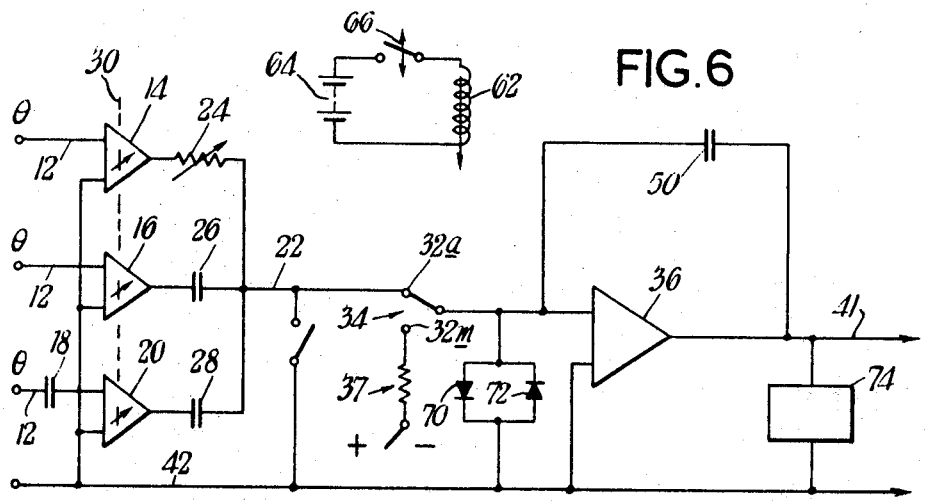
FIG. 6 is a circuit diagram, partly schematic, of a fifth controller device having a single capacitor combining integrating and memory functions.

In the circuit diagram of FIG. 6, the control term current signals $\theta$, $d\theta/dt$ and $d^2\theta/dt^2$ are generated by circuit arrangements corresponding to those of FIG. 1. The circuit in fact differs from that of FIG. 1 only in that the switch 54 and the capacitor 60 are omitted, the capacitor 50 being made to function also as a memory capacitor during manual operation.

During manual operation, with the movable contact of the switch 34 engaging the contact 32m and the switch 44 closed, the capacitor 50 is again connected on one side to the earth line 42 through the amplifier 36 and the line 52, its other side being charged to the output of the amplifier and thus of the device. Transfer to automatic operation by operation of the switch 66 to open the switch 44 and to move the switch 34 to the contact 32a will therefore not itself cause an alteration of the output so that the transfer is bumpless and balanceless.

During automatic operation, the capacitor 50 functions as a main function generating capacitor and it remains connected across the amplifier 36 during transfer to manual operation, so that this transfer operation is also balanceless and bumpless. The operation is thus generally similar to that of the circuits of FIGS. 1 and 2.

The circuit of FIG. 6 has the advantage of simplicity but its memory capability would suffer if proportional gain adjustment in the feedback path were required.

Figure 7:
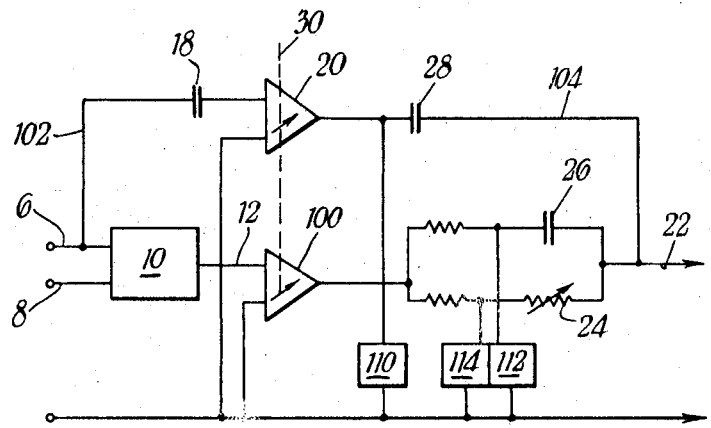
FIG. 7 is a circuit diagram of a modified control term signal generating arrangement for use in the controller devices of FIGS. 1–6.

A modified form of control term signal generating input circuit is shown in FIG. 7. As appears from the figure, voltages representing the measured value and the desired value of the condition under control are applied as before on lines 6, 8 respectively to a subtraction network 10, which provides as its output the control error signal $\theta$. To generate the proportional and integral action control term current signals, the signal $\theta$ from the network 10 is applied to a single variable gain voltage amplifier 100 the output of which is supplied both to the capacitor 26 and to the variable resistor 24, for development of the proportional and integral action control terms respectively. These are combined as before on the line 22. The derivative control term current signal is derived in the present circuit not from the control error $\theta$ but from the measured value signal taken from the input line 6 to the subtraction network 10 on a line 102 and applied to the capacitor 18, the variable current amplifier 20 and the capacitor 28 as before. The derivative control term current signal is again joined with the proportional and integral action current signals on the line 22 by the line 104. The remainder of the circuit comprises the amplifier 36 and either the single capacitor 50 or the two capacitors 50 and 60 as shown in FIG. 6 or in FIGS. 1–5 respectively, together with the associated components shown in these figures.

Instead of deriving the derivative control term current signal from the measured value signal, the output of the amplifier 100 could be applied to the capacitor 18, so that it is derived from the control error signal $\theta$.

FIG. 7 also shows as a feature additional to the circuits of FIGS. 1–6, but which can if desired be incorporated therein, the limit circuit means 110, 112 and 114 which serve to set limits to the derivative, proportional and integral action control term signals respectively.

Figure 8:
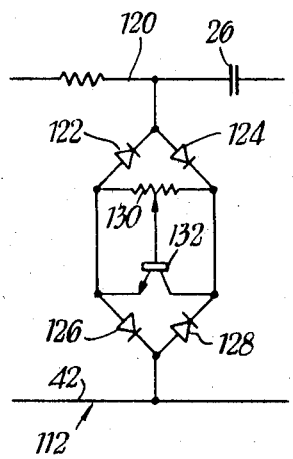
FIG. 8 is a circuit diagram of a control term signal limiting means for use in the controller devices of FIGS. 1–7.

One particular circuit suitable for use as the control term signal limiting means 112, and which is adjustable, is shown in FIG. 8. Between the line 120 carrying the control term signal and the earth line 42, four diodes 122, 124, 126 and 128 are arranged in a bridge network, with a potentiometer 130 and the collector and emitter of a transistor 132 connected in parallel across the remaining opposed apices of network. The base of the transistor is connected to the movable contact of the potentiometer. A similar circuit can be employed for either or both of the limiting means 110, 114.

Figure 9:
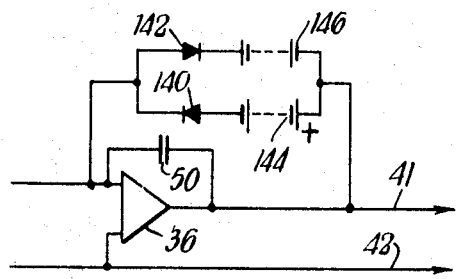
FIGS. 9, 10 and 11 are simplified partial circuit diagrams each illustrating an alternative form of limiting and desaturation arrangements for use in the circuits of FIGS. 1–7.
Figure 10:
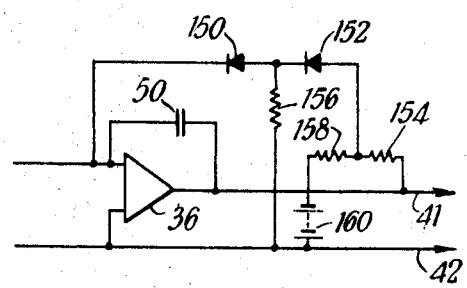
Figure 11:
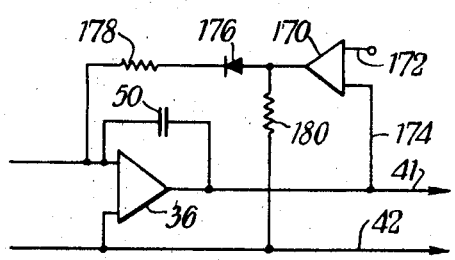

All the circuits so far described can include the two diodes 70, 72 for integral desaturation. FIGS. 9, 10 and 11 show alternative limiting and desaturation arrangements applied to the FIG. 6 circuit, only part of which is shown. The arrangements of FIGS. 9, 10 and 11 are applicable to any of the circuits shown in FIGS. 1–5 or 7. The use of the desaturation diodes 70 and 72 in these circuits has the disadvantage that a finite voltage drop is required to make the appropriate diode conduct and this allows some saturation to occur.

In FIG. 9 diodes 140, 142 in series with reference voltage sources 144, 146 respectively are connected in parallel across the integrating capacitor 50, the diodes 140 and 142 acting respectively as "top" and "bottom" desaturators.

FIGS. 10 and 11 show "top" or positive desaturators only, a single reference voltage source being provided.

In the arrangement of FIG. 10, a line from the input side of the amplifier 36 extends by way of a pair of diodes 150 and 152 and a resistor 154 to the amplifier output. A point between the diodes is connected to earth through a resistor 156 and a point between the diode 152 and the resistor 154 is connected through a resistor 158 to a source 160 of a reference voltage.

The arrangement of FIG. 11 comprises an amplifier 170 having a positive reference voltage applied to its input at 172, the other side of which is connected to the output side 41 of the amplifier 36 by a line 174. The output of the amplifier 170 is taken through a diode 176 and a resistor 178 to the input side of the main amplifier 36, and a point between the diode 176 and the amplifier 170 is earthed through a resistor 180. The resistor 178 inhibits desaturation in the presence of fast transient input signals due to noise for example. The amplifier 170 required can be very simple, involving only one or two transistors.

Positive desaturation is achieved during automatic operation in all the arrangements of FIGS. 9, 10 and 11 by limiting the charge on the function generating capacitor 50 to a predetermined value, so that a small decrease in the control error signal $\theta$ produces an effective reduction in the output of the device. The arrangement of FIG. 9 provides "bottom desaturation" also.

The arrangement of FIG. 10 has a lower limiting accuracy than that of FIG. 11 which however requires a floating limit reference voltage and involves reverse leakage through the diode 176.

The circuit arrangements of FIGS. 9, 10 and 11 all function as limiting circuits and any one of them can be used as the limiting means 110 of FIG. 7 for the derivative control term signal.

The invention thus provides a relatively simple electrical controller device affording "balanceless bumpless" transfer in either direction between automatic and manual operation. Such a controller is well suited to remote or computer operated control. The invention is not limited by the foregoing description, its scope being as defined in the following claims.

I claim:

1. An electric controller device having a source of an error signal, the error signal being derived from any difference between first and second signals representing respectively desired and measured values of a condition to be controlled, a source of a manually adjustable electric signal, circuit means comprising an amplifier means and a capacitor means, the amplifier means having first and second input terminals, an output terminal constituting the output terminal of the device, and an input circuit between the first and second input terminals, means connecting the second input terminal to circuit earth, means connecting at least part of the capacitor means between the first input terminal and the output terminal in a negative feedback configuration across the amplifier means, and switch means having first and second positions respectively connecting and disconnecting the manually adjustable source to the first amplifier input terminal, the circuit means functioning when the switch means is in the first position thereof to provide a control voltage obtained from the manually adjustable source at the output terminal and as a memory storing the control voltage during movement of the switch means to the second position thereof and the circuit means functioning when the switch means is in the second position thereof as in integrator to provide a control voltage derived from the error signal at the output terminal and as a memory for storing the control voltage during movement of the switch means to the first position thereof, whereby said switch means can be moved from the first to the second position thereof and from the second to the first position thereof without a balancing operation and without a discontinuity in the control voltage at the output terminal.

2. An electric controller device as claimed in claim 1 in which the source of the manually adjustable signal comprises a switch having at least two positions providing voltage or current signals of opposite polarity.

3. An electric controller device as claimed in claim 1 in which said error signal source comprises means for generating a plurality of control term signals from said first and second signals.

4. An electric controller device as claimed in claim 3 having means for limiting the magnitude of at least one of the control term signals.

5. An electric controller device as claimed in claim 1 in which said error signal source comprises means for generating proportional and integral action control term signals from the first and second signals.

6. An electric controller device as claimed in claim 5 having means for limiting the magnitude of the proportional control term signal.

7. An electric controller device as claimed in claim 5 having means for limiting the magnitude of the integral action control term signal.

8. An electric controller device as claimed in claim 5 in which said error signal source also includes means for generating a derivative control term signal from the first and second signals.

9. An electric controller device as claimed in claim 1 in which said error signal source comprises means for generating a derivative control term signal from said second signal.

10. An electric controller device as claimed in claim 9 having means for limiting the magnitude of the derivative control term signal.

11. An electric controller device as claimed in claim 3 having means for limiting the magnitude of each control term signal and means for adjusting independently each control term signal magnitude limiting means.

12. An electric controller device as claimed in claim 3 having means for independent adjustment of the control term signals.

13. An electric controller device as claimed in claim 12 having a variable gain amplifier for adjustment of each of the control term signals.

14. An electric controller device as claimed in claim 3 having means for adjustment of the control term signals collectively to provide proportional band control.

15. An electric controller device as claimed in claim 1 having means for imposing predetermined upper and lower limits on the output of the device and means for preventing integral saturation when either limit is reached.

16. An electric controller device as claimed in claim 15 in which the means for imposing the limits is an adjustable limiting means connected between said output terminal and circuit earth.

17. An electric controller device having a source of an error signal, said source comprising means for deriving said signal from any difference between first and second signals representing respectively desired and measured values of a condition to be controlled, a source of a manually adjustable electric signal, circuit means comprising an amplifier means and a capacitor means, the amplifier means having first and second input terminals, an output terminal constituting the output terminal of the device, and an input circuit between the first and second input terminals, means connecting the second input terminal to circuit earth, means connecting said capacitor means between the first input terminal and the output terminal in a negative feedback configuration across the amplifier means, and a switch means having first and second positions, the switch means in the first position thereof connecting said manually adjustable source to said first input terminal and disconnecting said error signal source therefrom, and in the second position thereof connecting said error signal source to said first input terminal and disconnecting said manually adjustable source therefrom, whereby when said switch means is in said first position a control voltage obtained from said manually adjustable source is provided at said output terminal, and when said switch means is in said second position, said circuit means functions as an integrator to provide a control voltage derived from said error signal at the output terminal, and the capacitor means having said control voltage stored therein during movements of the switch means between the first and second positions thereof whereby said switch means can be so moved with a balancing operation and without a discontinuity in the control voltage at the output terminal.

18. An electric controller device having a source of an error signal, said source deriving said error signal from any difference between first and second signals representing respectively desired and measured values of a condition to be controlled, a source of a manually adjustable electric signal, circuit means comprising an amplifier means and first and second capacitor means, the amplifier means having first and second input terminals, an output terminal constituting the output terminal of the device, and an input circuit between the first and second input terminals, means connecting said second input terminal to circuit earth, means connecting said first capacitor means between the first input terminal and the output terminal in a negative feedback configuration across said amplifier means, means connecting one side of the second capacitor means to the output terminal and a switch means having first and second positions respectively connecting and disconnecting said manually adjustable source to said first input terminal, and connecting the other side of the second capacitor means respectively to the first input terminal and to circuit earth, said circuit means functioning when the switch means is in the first position thereof to provide a control voltage obtained from said manually adjustable source at the output terminal, the amplifier means and the first capacitor means being responsive to said error signal when said switch means is in the second position thereof to function as an integrator to provide at said output terminal a control voltage derived from said error signal, and the second capacitor means having the control voltage stored therein during movements of the switch means between the first and the second positions thereof, whereby said switch means can be so moved without a balancing operation and without a discontinuity in the control voltage at the output terminal.

19. An electric controller device as claimed in claim 18 in which said switch means is adapted to connect said error signal source respectively to circuit earth and to the first amplifier input in the first and second positions thereof.

20. An electric controller device as claimed in claim 18 in which said error signal source comprises first generator means for generating proportional and derivative elements of said error signal means connecting said first generator means in series with said first capacitor means across the amplifier means and second generator means for generating an integral action signal element of said error signal, said switch means connecting said second generator means respectively to circuit earth and to said first amplifier input terminal in the first and second positions thereof.

21. An electric controller device as claimed in claim 18 having a summing resistor network for developing the proportional and derivative control term signals, said connecting means comprising a resistor of said network.

22. An electric controller device as claimed in claim 1 having a pair of diodes connected in opposed directions between the first input terminal and circuit earth to prevent integral saturation when an upper or lower limit to the output of the device is reached.

23. An electric controller device as claimed in claim 1 having first and second diodes, first and second reference voltage sources, and means connecting the first diode in series with the first reference voltage source and the second diode in series with the second reference voltage source in parallel with the amplifier means, the diodes and reference voltage sources being opposed in sense to impose upper and lower limits to the output of the device and to prevent integral saturation when either limit is reached.

24. An electric controller device as claimed in claim 1 having diode means, resistor means, a reference voltage source, and means connecting the diode means, the resistor means and reference voltage source across the amplifier means to provide an upper limit to the output of the device and to prevent integral saturation when the limit is reached.

References Cited

UNITED STATES PATENTS

| | | | |
|---|---|---|---|
| 2,764,701 | 9/1956 | Miller | 307—116 |
| 3,069,554 | 12/1962 | Decker et al. | 318—20.245 |
| 3,077,552 | 2/1963 | Koppel | 318—20.245 |
| 3,340,408 | 9/1967 | Ogawa et al. | 307—112 |

HERMAN O. JONES, Primary Examiner

T. B. JOIKE, Assistant Examiner

U.S. Cl. X.R.

318—18